March 6, 1928.  
G. MIDBOE  
1,661,191  
AUTOMATIC BRAKE ADJUSTING MECHANISM  
Filed Jan. 8, 1927

Inventor  
Gabriel Midboe  
By his Attorneys  
Redding, Greeley, O'Shea & Campbell Patented Mar. 6, 1928.

1,661,191

UNITED STATES PATENT OFFICE.

GABRIEL MIDBOE, OF BROOKLYN, NEW YORK, ASSIGNOR TO INTERNATIONAL MOTOR COMPANY, OF NEW YORK, N. Y., A CORPORATION OF DELAWARE.

AUTOMATIC BRAKE-ADJUSTING MECHANISM.

Application filed January 8, 1927. Serial No. 159,830.

This invention relates to brake adjusting mechanisms, particularly those applicable to the service and emergency braking systems found on most vehicles of today. It is well known that the difficulty of maintaining the several brakes disposed upon the respective wheels of the vehicle in adjustment has presented a problem, the solution of which has not been effectively accomplished as yet.

An object of the present invention is to provide an automatic means for adjusting each individual brake upon the reaching of a predetermined degree of mal-adjustment of the brake to be adjusted.

A further object of this invention is to construct the automatic adjusting mechanism above referred to in a convenient and effective position in the line of brake operating mechanism.

Reference will now be had to the accompanying drawings forming a part hereof for a more detailed description of the invention, wherein.

Figure 1:
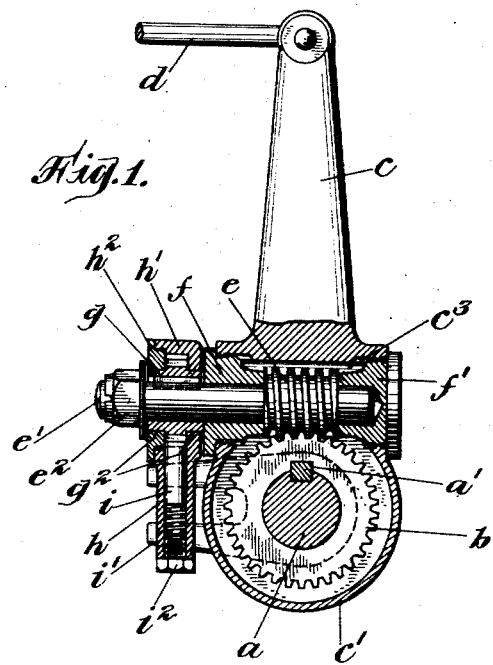
Figure 1 represents an elevation, partly in section, of a preferred form of the invention.
Figure 2:
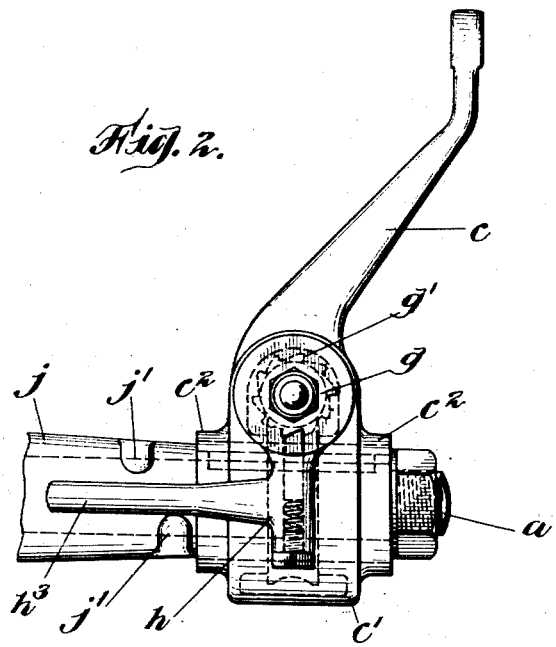
Figure 2 is a side elevation with the automatic adjusting means shown in dotted lines.

In the drawings, $a$ designates the brake cam shaft upon which is keyed or splined as at $a'$ a worm wheel $b$. The brake lever $c$, connected to the brake rod $d$, is provided with a housing $c'$ and bearing portions $c^2$ which permit the lever to move upon the cam shaft $a$. In the upper portion of the housing $c'$, a hollowed out, cylindrical, section $c^3$ is provided, within which worm $e$ is carried. Nuts $f$, $f'$ are adapted to be secured at either ends of the cylindrical portion $c^3$, and serve as bearing members for a shaft $e'$ which carries the worm $e$, and which rotates therewith.

On the projecting portion of the shaft $e'$ and outside of the cylindrical portion $c^3$ is keyed a hub $g$ which is provided with ratchet teeth $g'$, the hub having bearing surfaces $g^2$ on either side of the teeth $g'$. An arm $h$, provided with an annular portion $h'$, one side of which bears upon one bearing portion $g^2$ and the other side of which is adapted to receive a closure $h^2$ threaded thereinto, houses the ratchet portions $g'$. Within the downwardly extending portion of the arm $h$, a pawl $i$ is carried, a spring $i'$ seated by a suitable screw $i^2$ serving to urge the pawl into engagement with the teeth $g'$ of the ratchet wheel. Extending laterally from the arm $h$ is a portion $h^3$, the movement of which is limited by lugs $j'$ formed upon the housing $j$ which receives the cam shaft $a$. A nut $e^2$ secures the bracket $h$ and associated mechanism to the shaft $e'$.

The operation of the device is as follows: when the brake is in adjustment, movement of the brake rod $d$ to apply the brakes causes relative movement between lever $c$ and housing $j$. The worm and worm wheel being made with a very small helix angle, the relative position of the cam and lever will remain unchanged. By rotating the worm this can be changed, and the wear of the brake lining can be compensated from time to time as is found necessary. Should the brake be out of adjustment an excessive movement of lever $c$ will be required, and the lateral extension $h^3$ will engage one of the lugs $j'$, it being understood that the lugs are positioned upon the housing $j$ so that they will not be engaged by the element $h'$ as long as the brake is in proper condition. In the continued movement of the lever $c$ after the element $h^3$ has engaged a lug $j'$ the arm $h$, together with the pawl $i$, will turn with respect to the ratchet wheel $g$. Further movement in the application of the brake will cause the pawl to ride over the next tooth in the ratchet wheel and upon the return of the lever $c$, the cam $e$ will be turned to vary the position of lever $c$ with respect to the brake cam. It is obvious that the position of the cam with respect to the lever $c$ will be varied as the wear on the brake band increases, and in this manner the brake will be adjusted automatically.

Changes in design, and arrangement of the parts, may be made without departing from the scope of the invention claimed herein which is not to be limited save as defined in the appended claim.

What I claim is:

In an automatic brake adjusting mechanism, means for applying the brake, mounting means therefor, a brake lever associated therewith, a cylindrical housing receiving the brake applying means, a similar housing therein disposed transversely of the first housing, a worm wheel carried by the applying means and received within the first housing, a shaft transverse to the applying means and carried by the second housing, a worm mounted on the second shaft and engaging the worm wheel, a ratchet and pawl mechanism carried by the second shaft outside the second housing, an arm carried by the ratchet and pawl device, and spaced lugs upon the first named mounting means, said arm extending between the lugs whereby predetermined movement of the lever with respect to the mounting means causes the arm to engage a lug to effect the operation of the ratchet mechanism.

This specification signed this 6th day of January, A. D. 1927.

GABRIEL MIDBOE.